Figure 1:
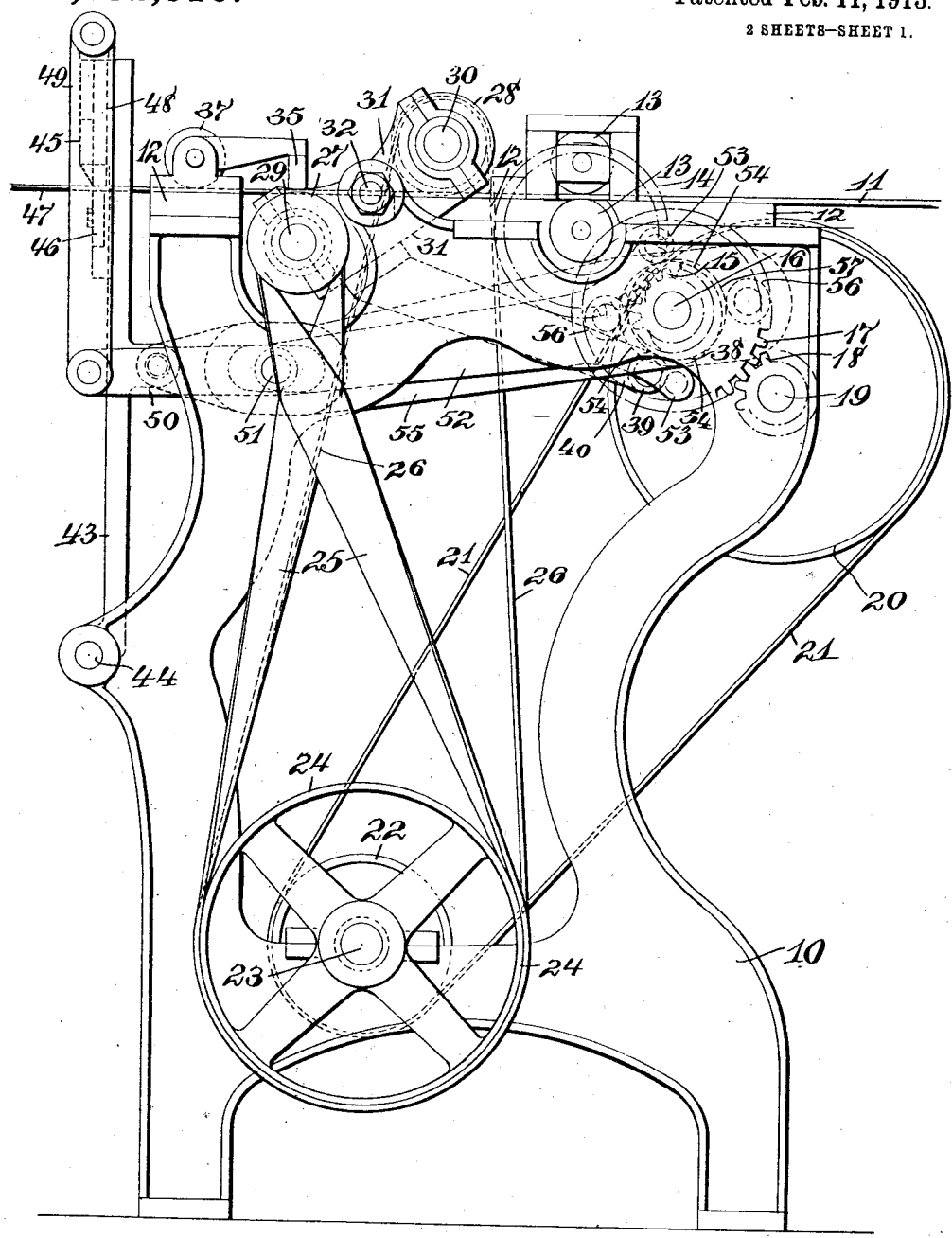

W. H. PARKER.
SPLINT MACHINE.
APPLICATION FILED DEC. 27, 1910.
1,052,510.
Patented Feb. 11, 1913.
2 SHEETS—SHEET 2.
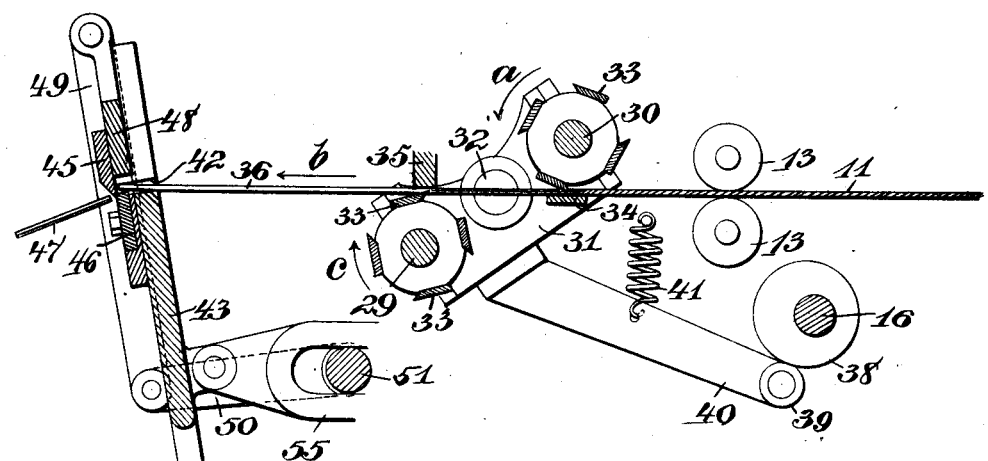
Fig. 2
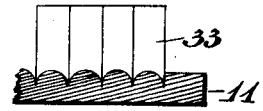
Fig. 3
36
Fig. 4
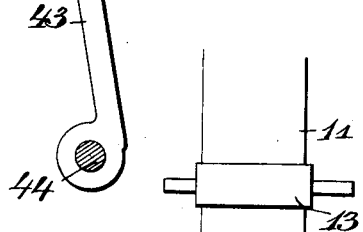
Fig. 5
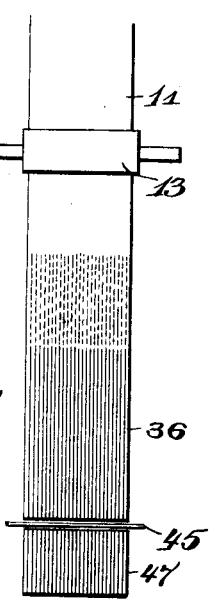
WITNESSES:
E. A. Pell
M. A. Johnson
INVENTOR
William H. Parker,
BY
Wm H Caufield
ATTORNEYS

UNITED STATES PATENT OFFICE.

WILLIAM H. PARKER, OF PASSAIC, NEW JERSEY, ASSIGNOR TO EDWARD STEWART, OF MINNEAPOLIS, MINNESOTA.

SPLINT-MACHINE.

1,052,510.   Specification of Letters Patent.   Patented Feb. 11, 1913.

Application filed December 27, 1910. Serial No. 599,493.

*To all whom it may concern:*

Be it known that I, WILLIAM H. PARKER, a citizen of the United States, residing at Passaic, in the county of Passaic and State of New Jersey, have invented certain new and useful Improvements in Splint-Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a splint machine used in the manufacture of toothpicks, matches and similar articles, and comprises mechanism for feeding stock in the shape of veneer, rotary cutters for cutting this stock into sticks, and a severing cutter for moving with the sticks while severing them into lengths or splints, this severing cutter, when the severing is complete, moving in a direction opposite the direction of travel of the sticks to its normal position ready for the next cut. This cutter permits a severing of the sticks while they are in motion, and saves time in the operation of the machine.

The invention also consists in mounting the rotary cutters in swinging relation to the frame, one cutter being on each side of the stock, so that they can be swung in unison to cut deeper at periodical intervals. This swinging of the rotary cutters causes a tapering cutting of the sticks and when these tapered sticks are severed they form tapered splints or toothpicks. The rotary cutters can be held stationary if desired so that the splints can be made of equal thickness throughout.

The invention is illustrated in the accompanying drawings, in which—

Figure 1 is a side view of the machine. Fig. 2 is a section illustrating the cutters and the severing mechanism. Fig. 3 is a cross-section, enlarged, showing a part of the stock when engaged by one of the rotary cutters, and Fig. 4 is a section showing the stock after it is cut into sticks. Fig. 5 is a diagrammatic top view of the successive operations of the machine.

The machine consists of a pair of side frames 10 which are arranged to permit the operating mechanism and the stock to be placed between them, the stock being in the shape of veneer 11 which runs on grooved tables 12, being fed by a pair of feed rolls 13 which can, if desired, be geared together to work in unison, being driven by a gear 14 meshing with a gear 15 which is on a shaft 16, this shaft carrying a gear 17 which is driven by a gear 18 on the drive-shaft 19, which drive-shaft is driven by a suitable pulley or other device not shown. On one side of the machine is a pulley 20 which is mounted on the drive-shaft 19 and, by means of a belt 21 and a pulley 22, drives the shaft 23. The shaft 23 has a pair of pulleys on each side of the machine, these pulleys 24 being connected, by belts 25 and 26, to the sheaves 27 and 28 which are on the outside on opposite sides of the machine and are driven by the belts 25 and 26 to rotate in opposite directions, as will be described hereinafter. These sheaves 27 and 28 are mounted on the shafts 29 and 30, respectively, which shafts are rotated by the sheaves, the shafts being mounted, on their opposite ends, in swinging bearings 31 which are arranged to rock on the pivotal connection 32 on the side frames 10. When these swinging bearings 31 are rocked they serve to move the rotary cutters 33 toward or from the stock 11 so that the depth of the cut of the cutters can be regulated. The cutter on the shaft 30 being above the stock it operates against a support 34, and the cutter on the shaft 29 being below the stock, it works opposite a top support 35, these supports acting to hold the stock while the cutters are working on the stock. The cutters 33 are adapted to cut from opposite sides of the stock, but in the same plane, one cutter 33 being adapted to normally go half way through the stock as shown in Fig. 3, the top cutter moving in the direction of the arrow *a*, and the stock moving in the direction of the arrow *b*, so that a clean cut is the result, and when the lower rotary cutter working in the direction of the arrow *c* engages the stock, the stock is cut into a row of parallel sticks as shown in Fig. 4. The illustration shows cutters which cut the stock into round sticks, but it will be evident that any shape can be cut according to the shape of the cutters, and square or other formed sticks can be cut from stock. Sticks 36, which result after the rotary cutters have completed their work, are fed along under a retaining roller 37.

On the shaft 16 is mounted a cam 38 which bears against a roller 39 on the end of an arm 40, which arm is fastened to the swinging bearing 31, and is normally pulled upward by a spring 41. It will be seen that this cam, through the arm 40, gives the swinging bearing an oscillating motion and periodically swings the rotary cutters closer to the stock, and therefore causes them to cut deeper into the stock. This motion gives a tapered cut in the stock, and when the sticks that result from this tapered cut are severed, they form tapered splints which are desirable very often in manufacturing toothpicks, they being beveled or tapered toward one or both ends according to the way they are beveled, which beveling can be regulated by the shape of the cam 38. The sticks are fed through an opening 42 in a cutter plate 43, which cutter plate swings on the rod 44 in the frames 10. Sliding in the cutter plate is a cutter 45 which is adapted to be slid across the opening 42 and act against a block 46 to transversely cut the sticks 36 into splints 47.

The cutter 45 is reciprocated on the cutter plate 43 by its slide piece 48 being operated from its opposite ends by the links 49 which are connected to levers 50 on each side of the machine, these levers being shown in Figs. 1 and 2, these levers rocking with a shaft 51 which in turn is rocked by a forked lever 52, its bifurcated end having the rollers 53 which are engaged by a cam 54. The cutter 45 is slid by this actuating mechanism so as to cut while the cutter plate is traveling in the direction of travel of the stock. The cutter plate moves in the direction of travel of the stock by being slid forward by an arm 55 which is slotted and supported on the shaft 51, and has, on its two ends, the rollers 56 which are moved back and forth through their engagement with a cam 57 which is mounted on the shaft 16. These cams are set and timed so that the swinging cutter plate moves forward with the stock while the cutter 45 is descending, and when the severing is completed the cutter 45 is raised by its cam 54 and then the cam 57, by pulling on the arm 55, swings the cutter plate back to its normal position shown in Fig. 1, and by that time enough material has come forward, coupled with the backward movement of the swinging cutter plate, to have enough stock projecting to equal the length of the splint desired, and another cutting operation takes place.

I do not wish to be limited to the particular form of cutting mechanism on the cutter plate 43, since it is evident that other means can be employed for severing the sticks into splints, other than the particular mechanism illustrated.

If it is desired to make splints that are not tapered it will be evident that the eccentric or cam 38 is replaced by a circular concentric plate which holds the swinging bearing fixed so that it does not swing while cutting.

The veneer or stock 11 fed to the machine can be of any width, but I prefer to use veneer about a foot wide, since this gives the best results and provides a good capacity for a machine which occupies very little floor space and which makes square or round splints of the same diameter for their entire length, or can be used to make tapered splints of any desired cross-section.

Having thus described my invention, what I claim is:—

A splint machine comprising a frame, guiding means on the frame, means for feeding stock through the guiding means, a cutter for cutting the stock longitudinally into parallel sticks, a rotating shaft in the frame, an operative connection between the rotary shaft and the feeding means, a cutter-plate pivoted to the frame, a block on the cutter-plate over which the stock is passed, a slide-piece above and movable toward and from the block, a cutter on the slide-piece and adapted to shear across the edge of the block for severing the veneer, links connected to each end of the slide-piece, a cam on the rotating shaft, a rocking shaft in the frame, levers secured to the shaft and the links for raising and lowering the links as the levers rock, a forked lever secured to the rocking shaft, the forked end of the lever embracing the cam to be operated thereby, an arm secured to the cutter-plate and having a slot therein embracing the rocking shaft for supporting the arm, and a second cam on the rotating shaft for engaging the arm to cause it to slide on the rocking shaft.

In testimony, that I claim the foregoing, I have hereunto set my hand this 7th day of December 1910.

WILLIAM H. PARKER.

Witnesses:
E. A. PELL,
M. A. JOHNSON.